US009327515B2

(12) United States Patent
Herloski (10) Patent No.: US 9,327,515 B2
(45) Date of Patent: May 3, 2016

(54) ELECTRONIC BANDING COMPENSATION (EBC) OF HALFTONE-INTERACTION BANDING USING VARIABLE BEAM DELAYS

(71) Applicant: Xerox Corporation, Norwalk, CT (US)

(72) Inventor: Robert Paul Herloski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/091,748

(22) Filed: Nov. 27, 2013

(65) Prior Publication Data

US 2015/0145943 A1 May 28, 2015

(51) Int. Cl.
| | | |
|---|---|---|
| *B41J 2/47* | (2006.01) | |
| *H04N 1/00* | (2006.01) | |
| *G06K 15/12* | (2006.01) | |
| *G06K 15/02* | (2006.01) | |
| *H04N 1/40* | (2006.01) | |

(52) U.S. Cl.
CPC *B41J 2/471* (2013.01); *B41J 2/473* (2013.01); *G06K 15/027* (2013.01); *G06K 15/1257* (2013.01); *H04N 1/00015* (2013.01); *H04N 1/40* (2013.01)

(58) Field of Classification Search
CPC ....... H01N 1/60; G03G 15/043; G03G 13/04; B41J 2/473; B41J 2/471; G06K 15/1209; G06K 15/1257; G06K 15/027; H04N 1/00015; H04N 1/40
See application file for complete search history.

(56) References Cited

U.S. PATENT DOCUMENTS

| | | | |
|---|---|---|---|
| 4,429,218 A | 1/1984 | Thomas | |
| 4,620,237 A | 10/1986 | Traino et al. | |
| 4,635,000 A | 1/1987 | Swanberg | |
| 4,663,523 A | 5/1987 | Swanberg | |
| 4,870,273 A | 9/1989 | Brueggemann | |
| 4,872,065 A | 10/1989 | Isono et al. | |
| 4,989,019 A | 1/1991 | Loce et al. | |
| 5,093,745 A | 3/1992 | Kuroda | |
| 5,111,062 A | 5/1992 | Hunter et al. | |
| 5,138,479 A | 8/1992 | Ando | |
| 5,248,997 A | 9/1993 | Summers | |
| 5,341,155 A | 8/1994 | Elrod et al. | |
| 5,485,195 A | 1/1996 | Nacman | |
| 5,519,514 A | 5/1996 | TeWinkle | |
| 5,539,441 A | 7/1996 | Appel et al. | |
| 5,550,653 A | 8/1996 | TeWinkle et al. | |
| 5,680,541 A | 10/1997 | Kurosu et al. | |
| 5,854,653 A * | 12/1998 | Derrick | 347/255 |
| 5,900,901 A | 5/1999 | Costanza et al. | |
| 5,933,182 A | 8/1999 | Appel | |
| 5,959,683 A | 9/1999 | Harrington | |
| 6,055,005 A | 4/2000 | Appel et al. | |
| 6,307,584 B1 | 10/2001 | Hirst et al. | |
| 6,320,682 B1 * | 11/2001 | Azumai et al. | 358/509 |

(Continued)

OTHER PUBLICATIONS http://en.wikipedia.org/wiki/Phasor; 7 pages, printed Jul. 2, 2013.

*Primary Examiner* — Sarah Al Hashimi
(74) *Attorney, Agent, or Firm* — Fay Sharpe LLP (57) ABSTRACT

Disclosed are methods and systems for compensating for process direction banding associated with a document processing system including a ROS. According to one exemplary embodiment, a ROS driver uses a plurality of beam delay/advance values to compensate for banding caused by an interaction of a halftone pattern and process direction density variations associated with the ROS.

17 Claims, 9 Drawing Sheets

(56) References Cited

U.S. PATENT DOCUMENTS

| | | |
|---|---|---|
| 6,342,963 B1 | 1/2002 | Yoshino |
| 6,411,336 B1 | 6/2002 | Harrington |
| 6,456,808 B1 | 9/2002 | Chen et al. |
| 6,462,821 B1 | 10/2002 | Borton et al. |
| 6,567,170 B2 | 5/2003 | Tandon et al. |
| 6,570,675 B1 | 5/2003 | Asada |
| 6,621,576 B2 | 9/2003 | Tandon et al. |
| 6,636,253 B2 | 10/2003 | Nishiguchi et al. |
| 6,654,044 B2 | 11/2003 | Akuta |
| 6,760,056 B2 | 7/2004 | Klassen et al. |
| 6,798,368 B2 | 9/2004 | Jung et al. |
| 6,819,352 B2 | 11/2004 | Mizes et al. |
| 6,859,295 B2 | 2/2005 | Matsuoka |
| 6,940,536 B2 | 9/2005 | Rauch et al. |
| 6,975,949 B2 | 12/2005 | Mestha et al. |
| 7,024,152 B2 | 4/2006 | Lofthus et al. |
| 7,038,816 B2 | 5/2006 | Klassen et al. |
| 7,058,325 B2 | 6/2006 | Hamby et al. |
| 7,090,324 B2 | 8/2006 | Mizes |
| 7,095,531 B2 | 8/2006 | Mizes et al. |
| 7,120,369 B2 | 10/2006 | Hamby et al. |
| 7,125,094 B2 | 10/2006 | Mizes |
| 7,136,616 B2 | 11/2006 | Mandel et al. |
| 7,177,585 B2 | 2/2007 | Matsuzaka et al. |
| 7,253,386 B2 | 8/2007 | Ernst |
| 7,266,250 B2 | 9/2007 | Bloomberg et al. |
| 7,391,542 B2 | 6/2008 | Tanimura et al. |
| 7,489,830 B2 | 2/2009 | Bloomberg et al. |
| 7,492,381 B2 | 2/2009 | Mizes et al. |
| 7,564,475 B1 | 7/2009 | Mizes |
| 7,787,162 B2 | 8/2010 | Pepe |
| 7,796,151 B2 | 9/2010 | Pepe |
| 7,834,900 B2 | 11/2010 | Ramesh et al. |
| 7,855,806 B2 | 12/2010 | Paul et al. |
| 7,884,816 B2 | 2/2011 | Burroughs et al. |
| 7,911,652 B2 | 3/2011 | Goodman et al. |
| 7,965,397 B2 | 6/2011 | Paul |
| 7,995,089 B2 | 8/2011 | Pepe |
| 8,233,021 B2 | 7/2012 | Herloski et al. |
| 8,351,079 B2 | 1/2013 | Ramesh et al. |
| 8,351,080 B2 | 1/2013 | Ramesh et al. |
| 8,467,103 B2 | 6/2013 | Wang et al. |
| 8,624,949 B2 | 1/2014 | Herloski et al. |
| 2002/0135822 A1 | 9/2002 | Morita et al. |
| 2007/0052991 A1 | 3/2007 | Goodman et al. |
| 2007/0139509 A1 | 6/2007 | Mizes et al. |
| 2007/0236747 A1 | 10/2007 | Paul et al. |
| 2008/0292342 A1* | 11/2008 | Yamashita ............... 399/51 |
| 2009/0002724 A1 | 1/2009 | Paul et al. |
| 2011/0058184 A1 | 3/2011 | Ramesh et al. |
| 2011/0058186 A1 | 3/2011 | Ramesh et al. |
| 2011/0058226 A1 | 3/2011 | Ramesh et al. |
| 2011/0228030 A1 | 9/2011 | Maeda |
| 2011/0298883 A1 | 12/2011 | Ohyama |
| 2011/0304867 A1* | 12/2011 | Tokoyama et al. ......... 358/1.9 |
| 2012/0308248 A1 | 12/2012 | Wayman et al. |
| 2013/0050699 A1 | 2/2013 | Proctor et al. |
| 2013/0148172 A1 | 6/2013 | Herloski et al. |
| 2013/0163055 A1 | 6/2013 | Herloski et al. |

\* cited by examiner

ELECTRONIC BANDING COMPENSATION (EBC) OF HALFTONE-INTERACTION BANDING USING VARIABLE BEAM DELAYS

CROSS REFERENCE TO RELATED PATENTS AND APPLICATIONS

U.S. patent application Ser. No. 13/313,533, filed Dec. 7, 2011, now U.S. Publication No. 2013/0148172, published Jun. 13, 2013 by Robert Herloski et al. and entitled "Printing System, Raster Output Scanner, and Method with Electronic Banding Compensation Using Facet-Dependent Smile Correction" and U.S. patent application Ser. No. 13/334,251, filed Dec. 22, 2011 (now U.S. Publication No. 2013/0163055, published Jun. 27, 2013) by Robert Herloski et al. and entitled "Process for Creating Facet-Specific Electronic Banding Compensation Profiles for Raster Output Scanners", are incorporated herein by reference in their entirety.

BACKGROUND

The present exemplary embodiments relate to printing systems with raster output scanner (ROS) apparatuses and to techniques for mitigating banding errors. Reprographic printing systems are used to create marked images on paper or other markable media, and improving the quality of the produced images is a continuing goal. Final image quality is affected by various sources of noise and errors in a reprographic system, leading to density variations in the marking material fused to the final print medium. In the reprographic process, a photoreceptor travels along a process direction, and images and text are formed as individual scan lines or groups of scan lines (sometimes referred to as a swath) in a raster scanning process in a cross-process direction, where the process direction motion is much slower than the raster scanning in the cross-process direction. Accordingly, the cross-process scanning direction is sometimes referred to as a "fast scan" direction, and the process direction is referred to as a "slow scan" direction.

Certain sources of reprographic system noise and errors cause periodic density variations in the process direction, which are sometimes referred to as "banding" errors. Periodic density variations may be characterized by frequency, amplitude, and phase in relation to a fundamental frequency, as well as harmonics. Various sources of banding exist in a marking (or print) engine. For example, raster output scanners employ rotating polygon mirror apparatus driven by a motor, known as a motor polygon assembly or MPA, with one or more light sources being scanned by rotation of the MPA such that scan lines are generated in the fast scan, i.e., cross-process, direction through reflection off a reflective facet of the rotating polygon mirror apparatus.

Differences in reflectivity, shape, profile, orientation, etc. in different reflective facets of the polygon lead to differences in image density, i.e., color intensity, in the final print out which are a function of which polygon facet was used to create a given scan line or swath of scan lines. As a result, the final print image may include bands of variations from the desired density that are periodic in the process direction. Other sources of banding errors include gears, pinions, and rollers in charging and development modules; jitter and wobble in imaging modules, as well as photoreceptors and associated drive trains. Banding usually manifests itself as periodic density variations in halftones in the process direction. The period of these defects is related to the once around frequency of the banding source. If not addressed, such periodic process direction density variations can render a reprographic printing system unacceptable, particularly where the banding errors are visually perceptible.

Banding can be addressed through reductions in the sources of such noise or errors and/or by compensation in various reprographic system components in order to counteract its affects. In practice, it is difficult to completely eliminate the error sources that contribute to banding, or even to reduce them enough to avoid perceptible periodic density variations. In addition, customer requirements are continually reducing the amount banding that is deemed to be acceptable. Consequently, banding compensation techniques have become an important tool in meeting reprographic system performance specifications. For instance, ROS exposure power can be varied in a controlled fashion to compensate for banding, and conventional banding compensation techniques include measurement of banding from one or more sources and the use of that information to actuate some correction strategy on a scanline by scanline basis to combat banding.

U.S. patent application Ser. No. 13/313,533, filed Dec. 7, 2011 by Robert Herloski et al. and entitled "Printing System, Raster Output Scanner, and Method with Electronic Banding Compensation Using Facet-Dependent Smile Correction" and U.S. patent application Ser. No. 13/334,251, filed Dec. 22, 2011 by Robert Herloski et al. and entitled "Process for Creating Facet-Specific Electronic Banding Compensation Profiles for Raster Output Scanners" describe electronic banding compensation for 1× and 2× ROS errors, related to the process direction banding caused by revolution of a MPA (motor polygon assembly).

This disclosure provides methods and systems to compensate for banding caused by the interaction of a halftone design and swath to swath variations associated with a ROS.

INCORPORATION BY REFERENCE http://en.wikipedia.org/wiki/Phasor, 7 pages;

U.S. Patent Publication Application No. 2011/0298883, published Dec. 8, 2011, by Ohyama and entitled "Image Forming Apparatus";

U.S. Patent Publication Application No. 2011/0228030, published Sep. 22, 2011, by Maeda and entitled "Image Forming Apparatus and Turn-On Time Correction Method;

U.S. Pat. No. 7,391,542, issued Jun. 24, 2008, by Tanimura et al. and entitled "Optical Scanning Apparatus and Image Forming Apparatus Using the Same";

U.S. Pat. No. 6,636,253, issued Oct. 21, 2003, by Nihiguchi et al. and entitled "Light Scanning Apparatus";

U.S. Pat. No. 6,307,584, issued Oct. 23, 2001, by Hirst et al. and entitled "Single Polygon Scanner for Multiple Laser Printer";

U.S. Pat. No. 5,248,997, issued Sep. 28, 1993, by Summers and entitled "Facet Reflectance Correction in a Polygon Scanner", are incorporated herein by reference in their entirety.

BRIEF DESCRIPTION

In one embodiment of this disclosure, described is a raster output scanner (ROS) for generating an image on a portion of a light-receiving medium traveling along a process path past the ROS, the ROS comprising: a plurality of light sources operative to generate a plurality of light outputs; a driver operatively associated with the plurality of light sources and operative to selectively actuate the plurality of light sources individually according to corresponding scan line image data to produce a corresponding plurality of modulated light outputs, the driver operatively associated with a memory storing a plurality of beam timing values corresponding to each of the plurality of light sources, the beam timing values set to compensate for banding caused by an interaction with a halftone pattern and process direction density variations associated with the ROS, each beam timing value associated with a cross-process direction delay or advancement of a respective light source, the driver configured to selectively actuate the plurality of light sources according to the corresponding beam timing values based on the scan line image data to produce the plurality of modulated light outputs; and a scanner that directs the modulated light outputs from the light sources toward a light receiving medium along the cross-process direction to generate an image on at least a portion of the light receiving medium.

In another embodiment of this disclosure, described is document processing system comprising: at least one marking device operative to transfer marking material onto an intermediate medium; a transfer station positioned proximate a travel path of the intermediate medium and operative to transfer the marking material from the intermediate medium to a printable media; and a raster output scanner (ROS) operatively associated with the at least one marking device to generate an image on a portion of a light-receiving medium, the ROS including: a plurality of light sources operative to generate a plurality of light outputs; a driver operatively associated with the plurality of light sources and operative to selectively actuate the plurality of light sources individually according to corresponding scan line image data to produce a corresponding plurality of modulated light outputs, the driver operatively associated with a memory storing a plurality of beam timing values corresponding to each of the plurality of light sources, the beam timing values set to compensate for banding caused by an interaction with a halftone pattern and process direction density variations associated with the ROS, each beam timing values associated with a cross-process direction delay or advancement of a respective light source, the driver configured to selectively actuate the plurality of light sources according to the corresponding beam timing values based on the scan line image data to produce the plurality of modulated light outputs; and a scanner that directs the modulated light outputs from the light sources toward a light receiving medium along the cross-process direction to generate an image on at least a portion of the light receiving medium.

In still another embodiment of this disclosure, described is a method of manufacturing or adjusting a document printing system, the method comprising: operatively coupling a raster output scanner (ROS) with a marking station in a document processing system; determining a plurality of beam timing values corresponding to individual ones of a plurality of light sources of the ROS so as to compensate for banding caused by an interaction with a halftone pattern and process direction density variations associated with the document printing system; and storing the plurality of beam timing values in a memory associated with the ROS.

DETAILED DESCRIPTION

Provided herein are methods and systems to compensate for banding caused by the interaction of Raster Output Scanner (ROS) variations with a halftoned image. The interaction of ROS variations with a halftoned image can cause an objectionable printed output density variation at a spatial frequency that is visually perceptible. The disclosed method and system provide the use of one or more fast scan beam delays operatively associated with a multibeam ROS as an actuator for a compensation scheme to reduce banding. Examples of a multibeam ROS include, but are not limited to, a VCSEL (Vertical-Cavity Surface-Emitting Laser), and multibeam laser diodes. The fast scan beam delays may be positive or negative to delay or advance, respectively, to a fast scan beam relative to one or more other beams or a nominal value. The provided actuator has enough compensation authority to perform the compensation function. Tests demonstrate the compensation holds for a particular ROS over different machines and does not significantly contribute to other image quality defects. Benefits of the disclosed method include improving the image quality of printed output and enabling ROS modules with certain errors to function properly in a printing system.

As discussed in the background section, in any reprographic printing system, there are various sources of noise and errors that can result in density variations in a printed output in the process direction, which is also referred to as the slow scan direction. Periodic variations of image density in the process direction are typically known as banding. The classic method of eliminating banding, i.e., reduce it to an imperceptible level, is to reduce/eliminate the various source of noise and errors contributing to it.

In a reprographic printing system that uses a ROS to produce an aerial image on a photoreceptor drum or belt for processing by the printing system, there are various errors that occur at relatively high spatial frequencies. At these relatively high spatial frequencies, the perceptibility of density variations decreases significantly, so relatively large errors at the high spatial frequencies are tolerable. However, in printing xerographic representations of continuous tone images, halftones are used to convert the continuous tone images into binary data suitable for printing with a xerographic system. Under certain circumstances, the high spatial frequency ROS errors mix, i.e., beat, with the halftone frequencies, resulting in highly visible lower spatial frequency banding. Thus, if the errors at the high spatial frequencies cannot be reduced enough to eliminate visibility of the lower spatial frequency beat frequency banding, then compensation techniques need to be used to reduce the residual low frequency banding to an unperceivable level.

As the required performance of reprographic printing systems increases, printing system specifications become tighter and tighter. Consequently, it is much more difficult to reduce the sources of errors contributing to halftone-interaction banding to meet these tighter system specs, hence the increased importance of banding compensation.

For example, a multibeam ROS associated with one xerographic printing system, with a product-intent 180 dpi halftone, produces a primary interaction/beat frequency of the associated halftone with a 32 beam ROS swath, which, in overwrite mode, moves ~16 beams per swath, of 766 Hz (1.31 cycles/mm), and is very visible in prints.

Within-swath errors, such as (a) variations in beam power, (b) variations in the slow scan position of beams, and (c) variation in the fast scan position of beams, contribute to 766 Hz banding. In addition, swath to swath slow scan spacing errors also contribute to 766 Hz banding. Any one of these sources of error can be used as an actuator to inject a known amount of error that compensates for the original error, via the concept of frequency-based vector/phasor addition.

In an exemplary multibeam laser diode array there is a named ASIC (Application-specific Integrated Circuit) that controls the operation of the laser source. Note that this source consists of 32 lasers and each "scanline" of the ROS consists of 32 beams scanned simultaneously. Included in the named ASIC is the ability to vary the timing of each beam individually in the fast scan direction. For purposes of this disclosure, and the exemplary embodiments disclosed herein, these are called "beam delays", or in the alternative, "beam timing values", and are normally used to ensure all beams "line up" vertically in a swath as the swath is scanned in the fast scan direction. If one intentionally advances or delays a beam a small amount relative to the others, this generates a known component of 766 Hz banding which can be used to compensate for the vector resultant of the other sources of 766 Hz banding. To simplify matters, modifications to beam delays are NVM (non-volatile memory)-settable.

Figure 1:
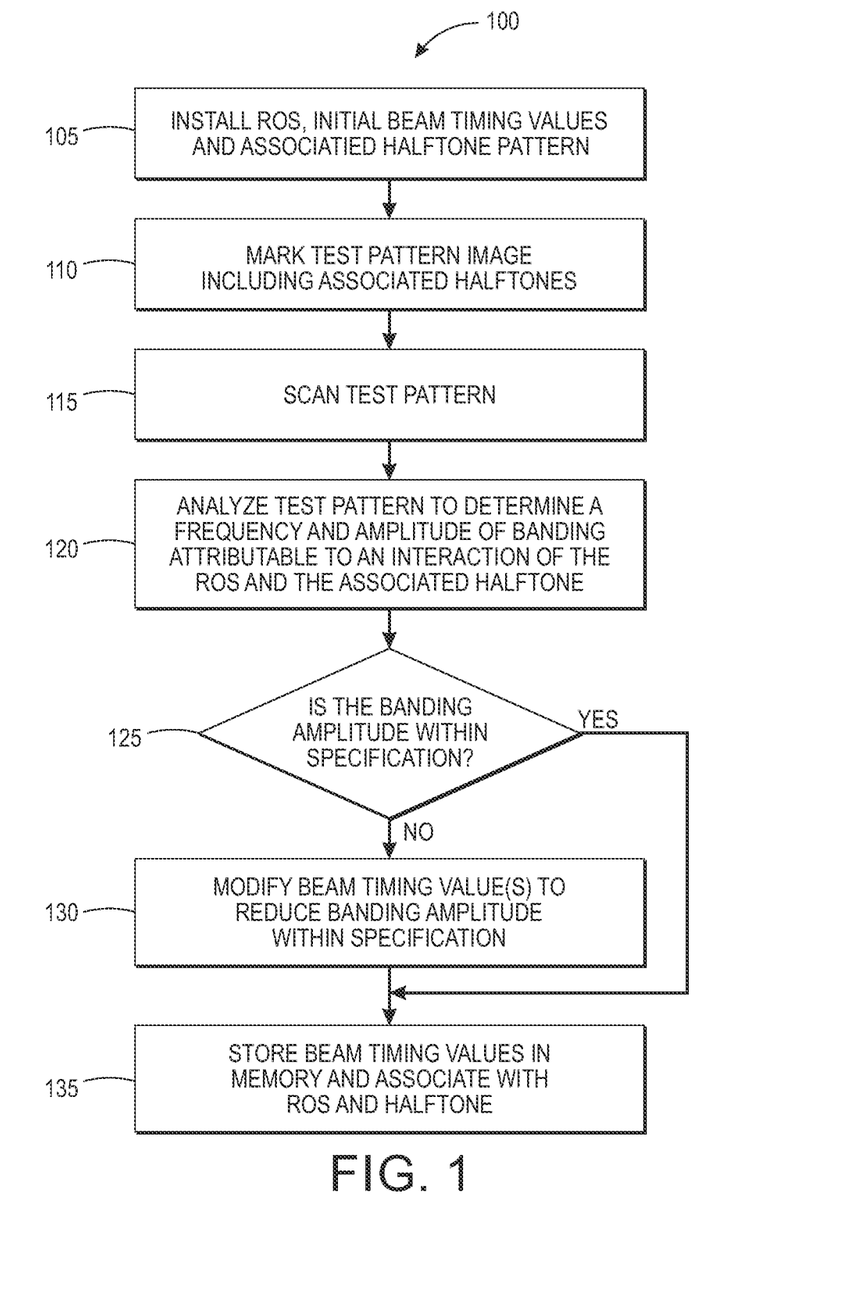
FIG. 1 is a flow chart of a ROS process including a plurality of beam delay values set to compensate for banding according to one exemplary embodiment of this disclosure.

With reference to FIG. 1, now is described an exemplary method of compensating for banding caused by an interaction, i.e., beating, of a halftone pattern and process direction density variations associated with a ROS by adjusting variable beam timing values during a ROS setup process. It is to be understood that the exemplary method of FIG. 1 is directed to a single ROS associated with a single halftone pattern, for example, a black toner ROS. However, it is also to be understood the described banding compensation method can be applied independently to each of a plurality of ROSs where each ROS is associated with a distinct colorant and halftone pattern. Importantly, the frequency of the banding being compensated for, according to the exemplary method and system provided herein, is dependent on the ROS configuration and halftone structure associated with the ROS. Specifically, as will be further described below, the swath characteristics of the ROS, including beam spacing, as well as the structure of the associated halftone, i.e., frequency, angle and/or spot growth pattern, effect the relatively low frequency beating which manifests as banding and is being compensated for according to this disclosure and the exemplary embodiments described herein.

Initially, the EBC (Electronic Banding Compensation) of halftone interaction banding process 100 begins at step 105 by installing a ROS, the initial beam timing values and the associated halftone pattern.

Next, at step 110, the process marks an image of a test pattern including the associated halftone pattern. For example, a test pattern may include 50% area coverage of the associated halftone pattern covering nearly a full media sheet or pitch associated with a photoreceptor or intermediate transfer belt.

Next, at step 115, the process scans the marked test pattern.

Next, at step 120, the process analyzes the test pattern to determine a frequency and amplitude of banding present in the printed test pattern which is attributable to an interaction of the ROS and the associated halftone.

Next, at step 125, the process determines if the banding amplitude is within the specifications of the printing system.

If the banding is within the specifications of the printing system, i.e., not perceptible under normal viewing conditions, no modification of the ROS beam timing values, i.e., beam delays, is necessary and the process associates initial beam timing values with the ROS and halftone at step 135.

If the banding is not within the specifications of the printing system, the process advances to step 130 where the ROS beam timing values are modified, either by advancing or delaying one or more beams, relative to one or more other beams, to reduce the banding amplitude within the specification of the printing system.

Finally, at step 135, the process stores the modified beam timing values in a memory and associates the modified beam timing values with the installed ROS and halftone pattern.

While the EBC process described with reference to FIG. 1 provides a description of the basic processes involved in performing an exemplary EBC process utilizing beam timing value modifications to delay or advance a ROS beam relative to the other ROS/Swath beams, further details of the operation of the subject EBC, as well as a specific example and results, and a general background of vector/phasor addition, are provided below.

Any banding compensation technique, where banding is defined as a particular process-direction density variation at a particular spatial frequency on a print, uses the concept of vector, or phasor, addition.

The EBC (Electronic Banding Compensation) process for 1×/2× banding as described in U.S. patent application Ser. No. 13/313,533, filed Dec. 7, 2011, now U.S. Publication No. 2013/0148172, published Jun. 13, 2013, by Robert Herloski et al. and entitled "Printing System, Raster Output Scanner, and Method with Electronic Banding Compensation Using Facet-Dependent Smile Correction" and U.S. patent application Ser. No. 13/334,251, filed Dec. 22, 2011, now U.S. Publication No. 2013/0163055, published Jun. 27, 2013, by Robert Herloski et al. and entitled "Process for Creating Facet-Specific Electronic Banding Compensation Profiles for Raster Output Scanners" uses the concept of vector, or phasor, addition. This disclosure, and the exemplary embodiments included herein, also uses the concept of vector, or phasor, addition for 766 Hz EBC.

A key "signature" for phasor addition is the appearance of a sinusoidal-like variation in response as a function of phase.

Figure 2:
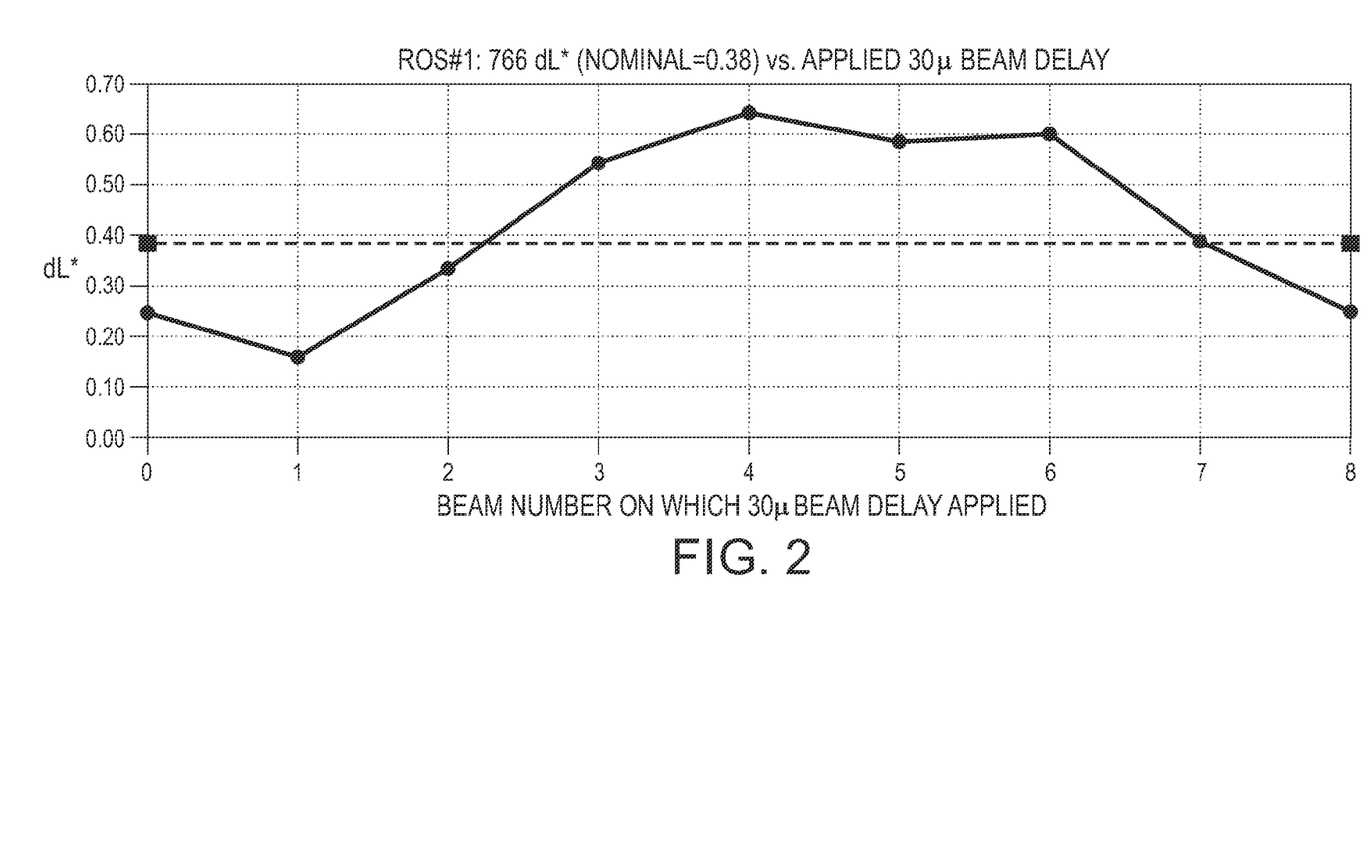
FIG. 2 is a plot of the dL* (image brightness variation) associated with a test ROS as the beam delay applied to a beam is varied.
Figure 3:
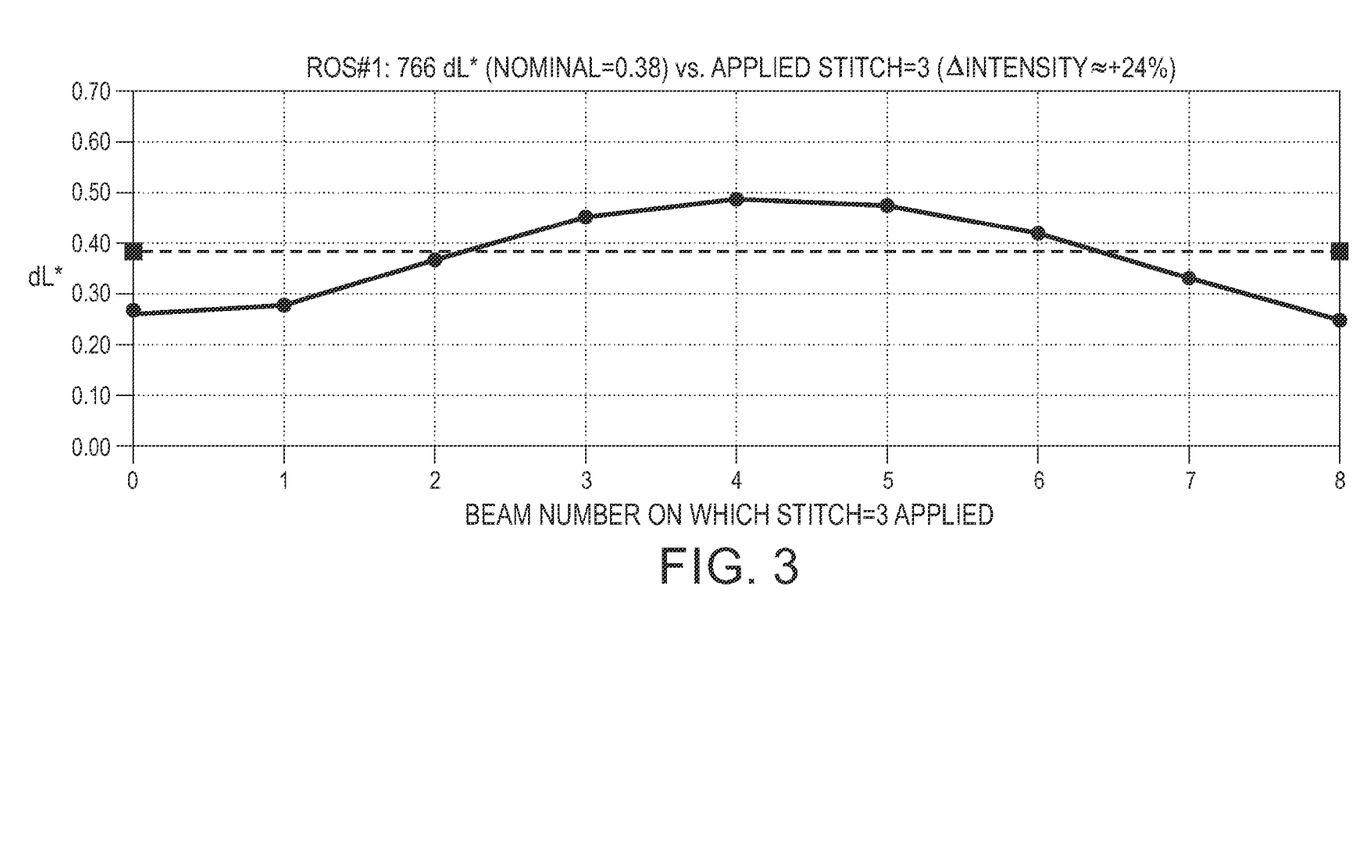
FIG. 3 is a plot of the dL* associated with the test ROS used for FIG. 2 as the intensity of a beam is varied.

Described now are two tests that were run on a ROS configured according to an exemplary embodiment of this disclosure. FIG. 2 shows a plot of varying the beam delay applied to a beam by 30 μm and FIG. 3 shows a plot of varying the intensity of a beam by 24%.

Figure 4:
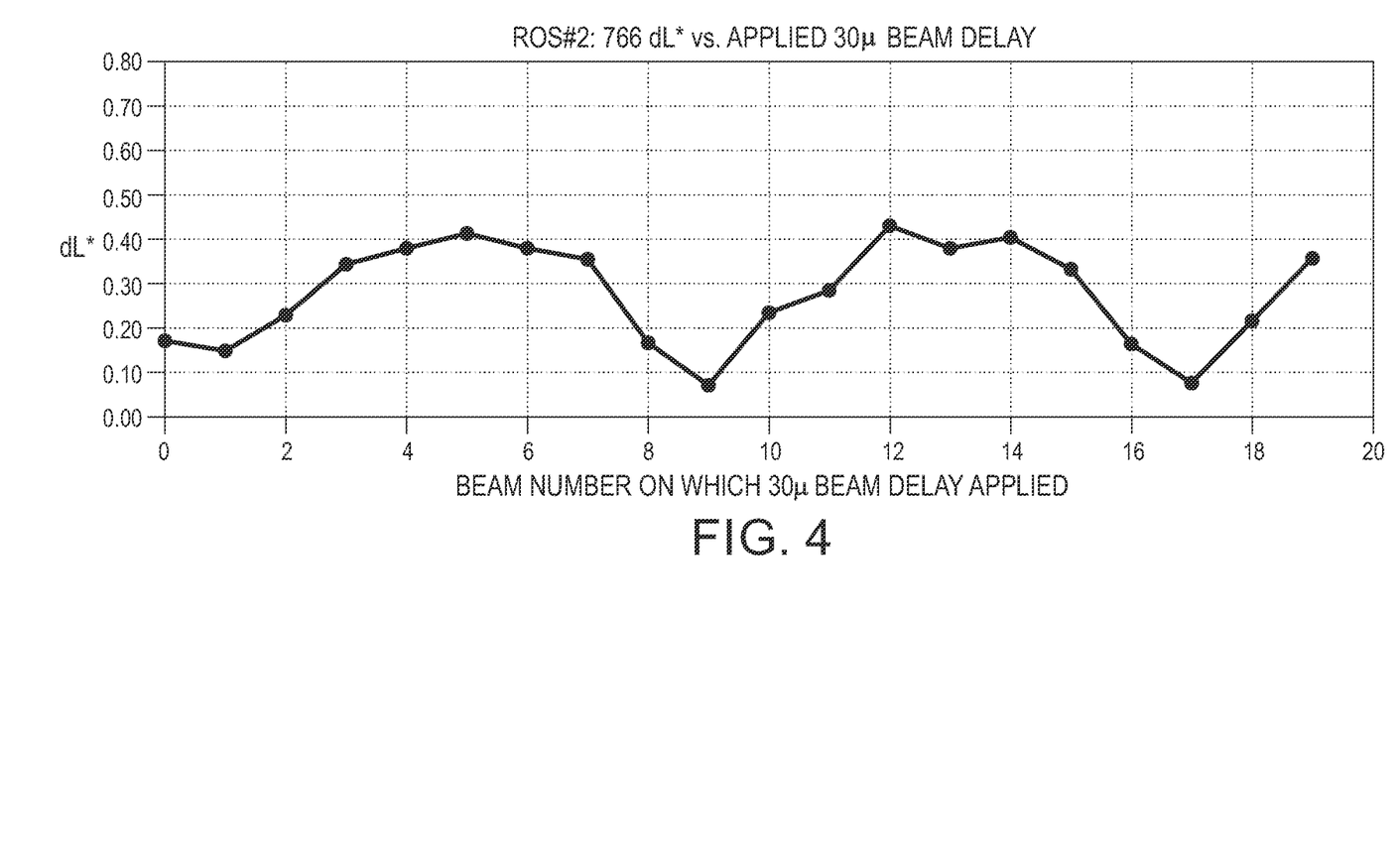
FIG. 4 is a plot of the dL* associated with another test ROS as the beam delay applied to a beam is varied.

Both techniques produce a sinusoid-like variation in response and the beam delay technique appears to have more dynamic range needed to get full compensation. FIG. 4 is a repeat on another ROS:

From the figures it becomes apparent, if a delay is applied to beams 9 or 17, a substantially full compensation of the 766 Hz dL* (image brightness variation) banding can be achieved.

Figure 5:
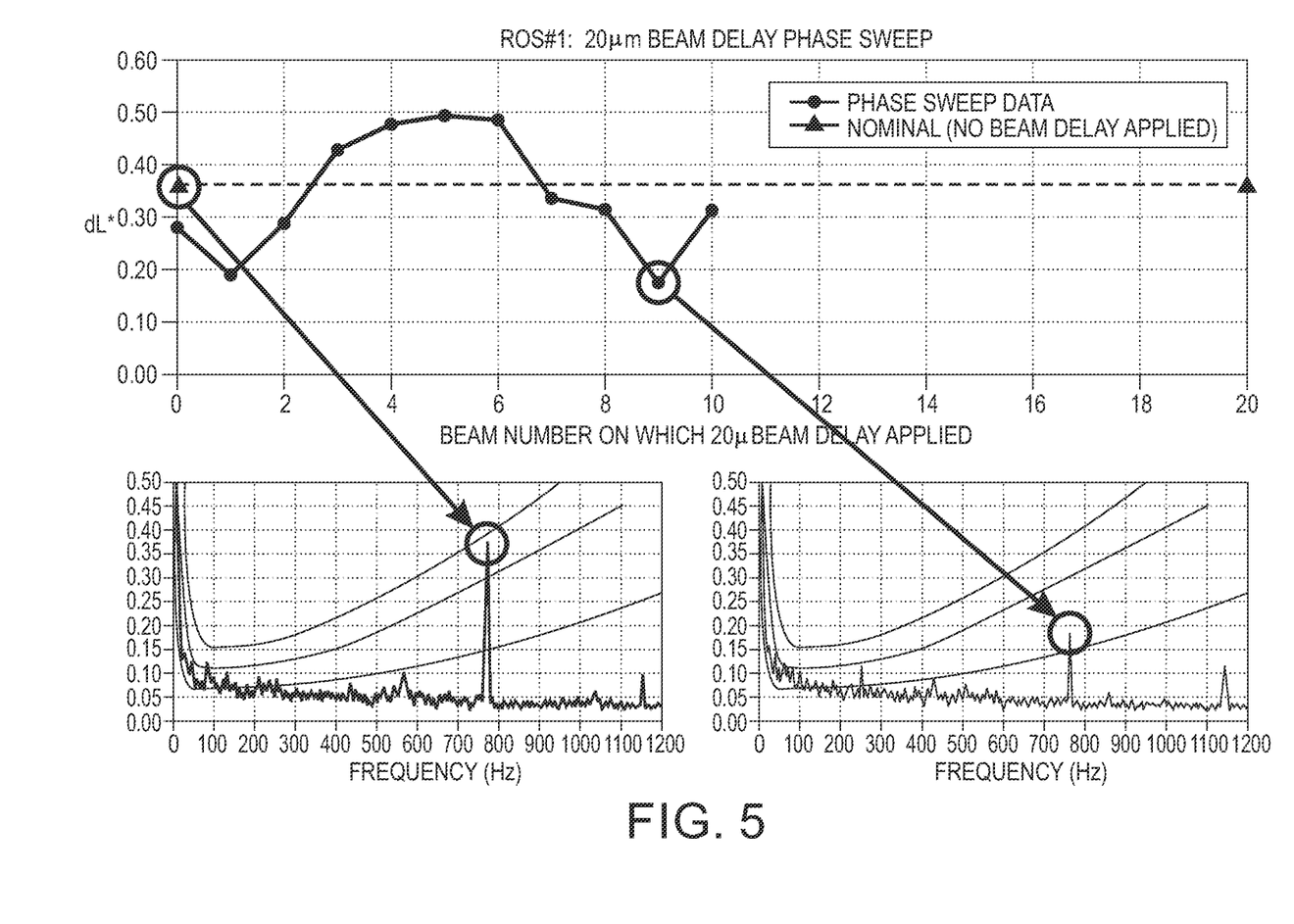
FIG. 5 slows test results for a 20 μm beam delay phase sweep applied to the test ROS fused for FIG. 2 and FIG. 3.

FIG. 5 shows a plot of another example, showing a reduction in the FFT (Fast Fourier Transform) signature.

There are many potential variations for using beam delays to perform 766 Hz EBC. For example, one beam alone can be delayed, or two beams can be delayed, or all beams can be varied sinusoidally with an appropriate phase. A key concept here is to use whatever combination of beams is needed, such that the Fourier transform of the total beam delays, e.g., 32 beams, produces an appropriate spatial frequency phasor that compensates for the initial errors.

One method of determining the appropriate beam delays to compensate for banding at a particular frequency associated with a particular halftone structure includes deterministic measurements where the banding performance of a ROS and associated halftone pattern is essentially quantified relative to a range of beam delay changes for a plurality of ROS beams and ultimately the beam delay values are selected based on the measured performance levels and range of beam delay values to reduce the beating of the ROS error frequency with the associate halftone pattern to within the dL* specification of the printing system. As previously discussed, the banding frequency will vary depending on the halftone structure associated with a particular ROS design. In other words, differences in the frequency, angle and dot growth design between two halftone patterns will produce different banding frequencies which are being compensated for according to the exemplary methods and systems described herein. Banding frequencies in the range of 5-3000 Hz are of particular significance, however, the disclosed method and system is not limited to a specific banding frequency or range of banding frequencies.

Figure 6:
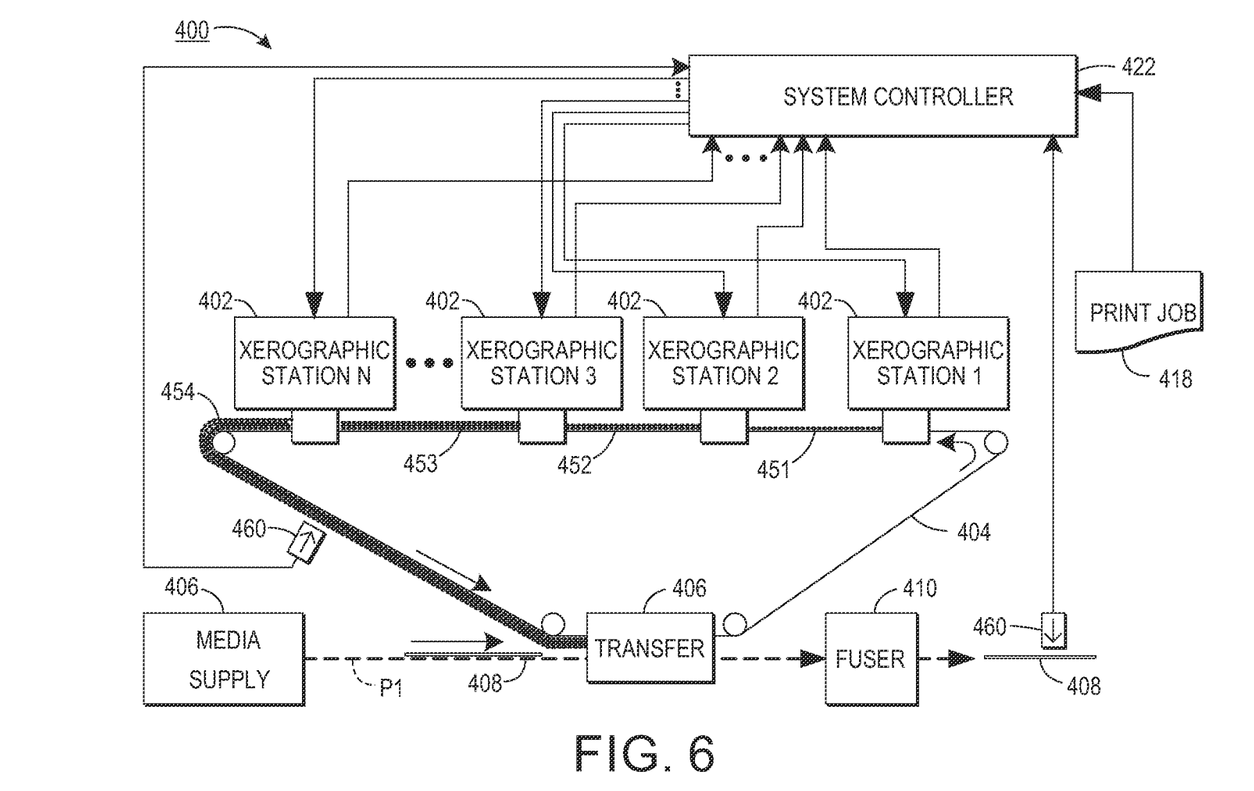
FIG. 6 is a simplified schematic system level diagram illustrating an exemplary multi-color document processing system in which the marking devices include ROS operable using electronic banding compensation according to this disclosure.
Figure 7:
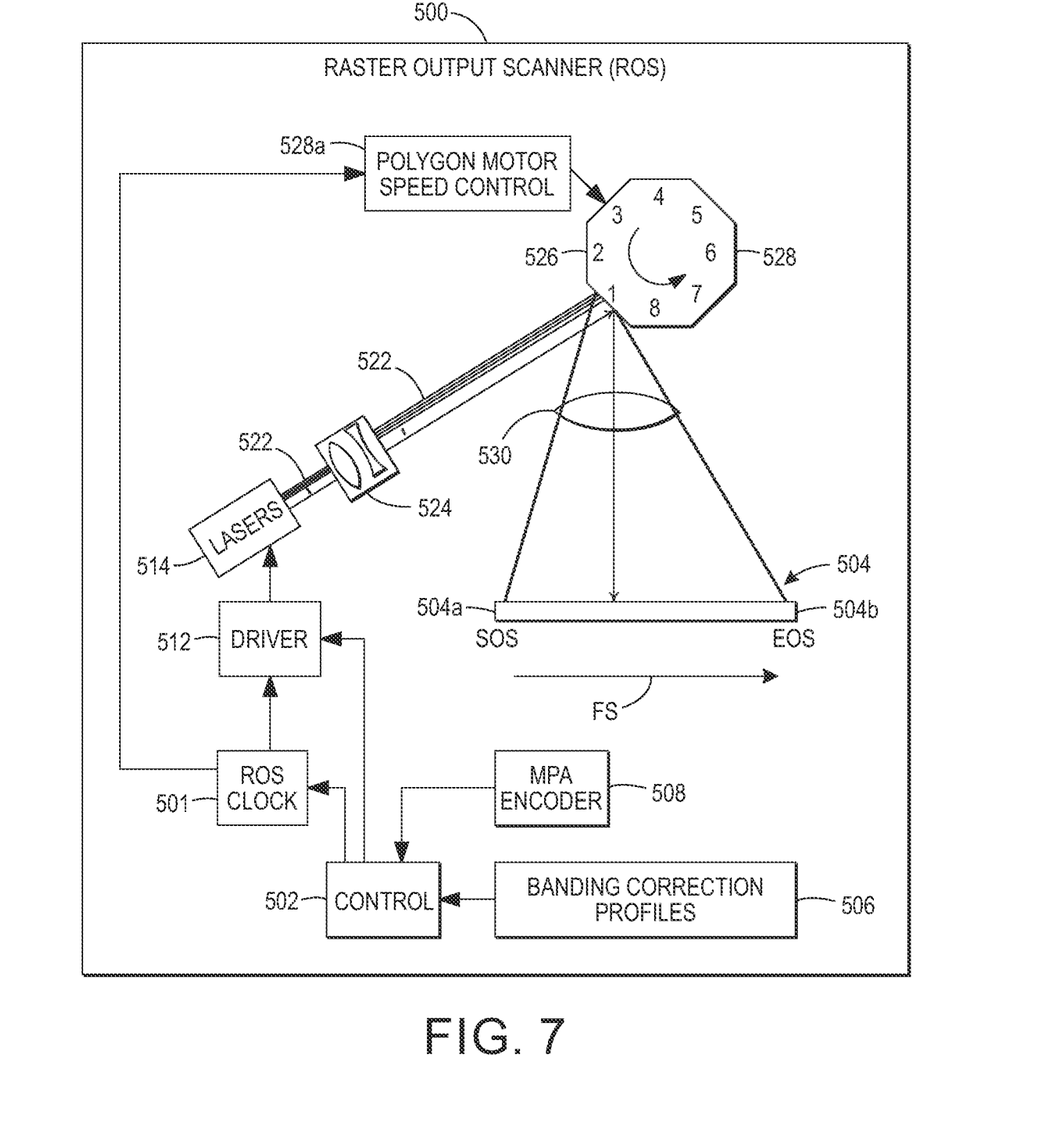
FIGS. 7-9 are simplified schematic diagrams illustrating an exemplary ROS using an electronic banding compensation process including beam delays according to various aspects of this disclosure.
Figure 8:
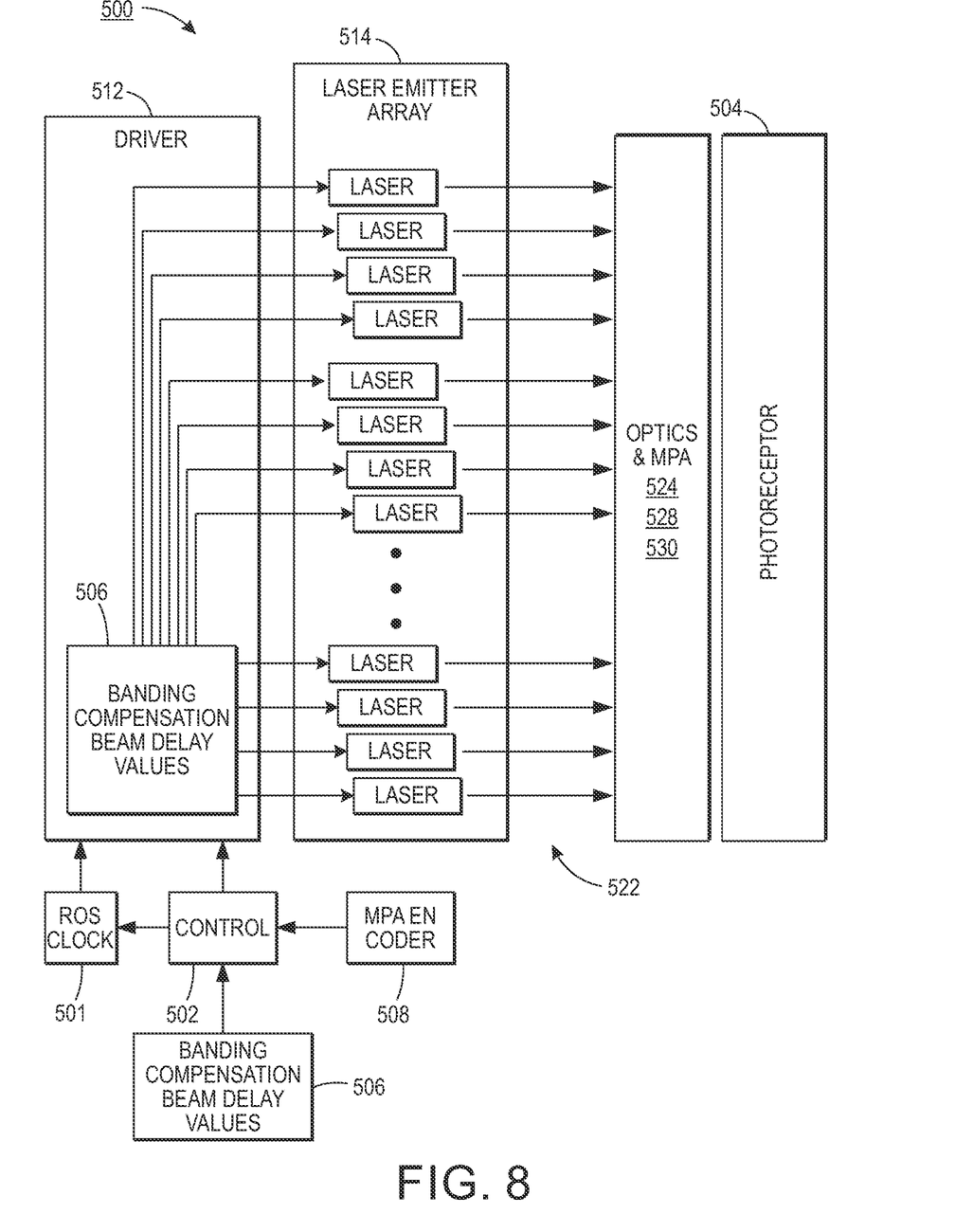
Figure 9:
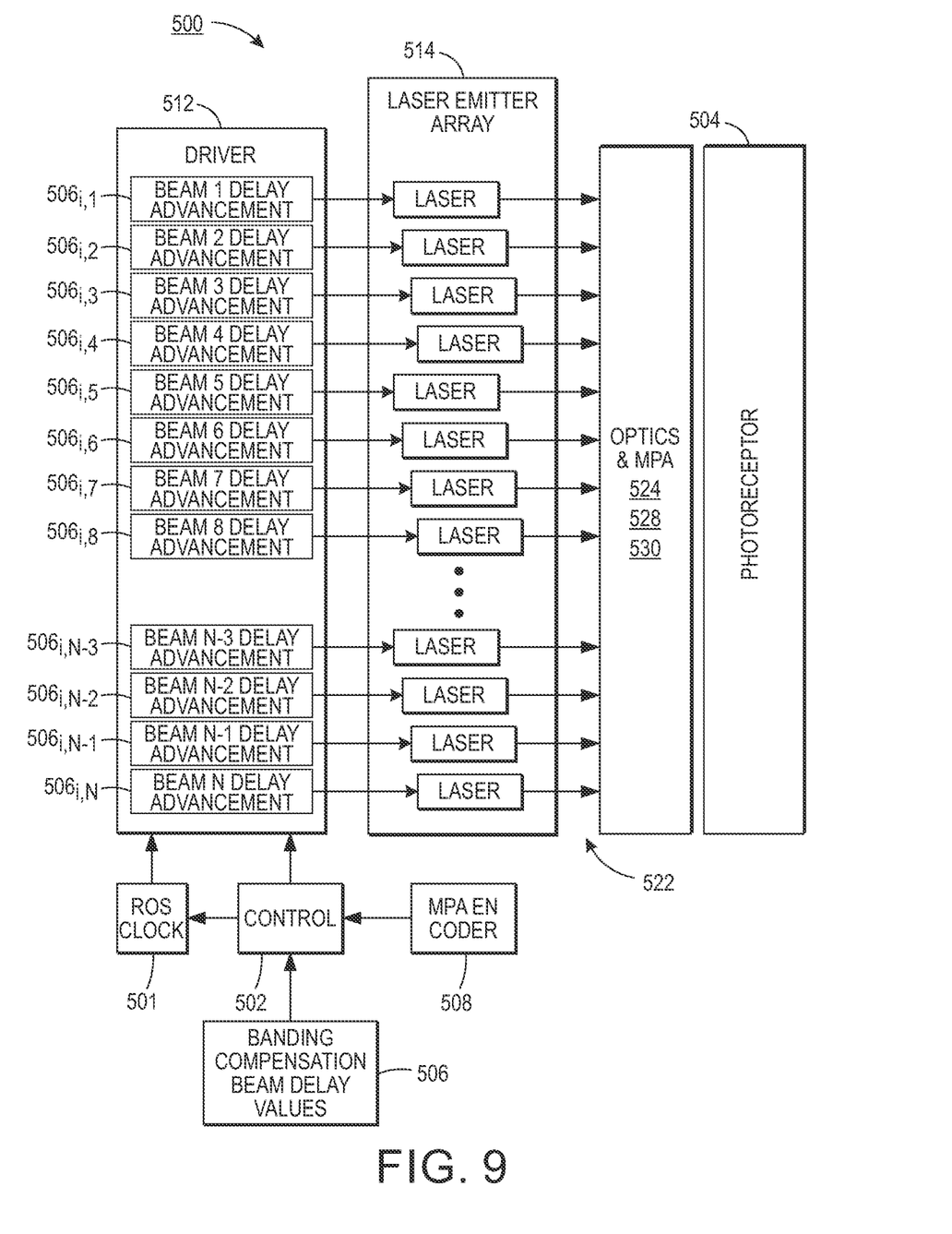

Referring now to FIGS. 6-9, as discussed above, a process 100 is used to generate electronic banding compensation beam delays according to this disclosure. Furthermore, a processing system using on-board processing elements 422 and sensors 460, or a process 100 using external computational and analytical components can be used to implement the image process including EBC as described herein. FIGS. 6-9 show an exemplary document processing system 400 (FIG. 6) and a ROS 500 thereof (FIGS. 7-9) in which stored banding correction beam delay values 506 are used to selectively delay or advance the timing of one or more modulated light outputs 522 to mitigate banding in a normal printing operation. In addition, the system 400, if equipped with a scanner or other sensors 460, may implement automated banding compensation in accordance with the above described processes. The illustrated document processing system 400 is a multi-color printing system including a system controller 422 with which one or more of the above described processing functions may be implemented. In this system 400, included are multiple individual marking devices 402, i.e. print engines, each including a ROS 500 as shown in FIGS. 7-9. Each ROS of each marking device 402 may be initially setup or thereafter adjusted for banding correction in accordance with the method 100 above. The marking devices 402 individually transfer toner marking material from a photoreceptor drum (not shown) to an intermediate transfer belt (ITB) 404 traveling past the marking devices 402. In this regard, the banding compensation techniques illustrated and described herein can be employed in intermediate transfer belt (ITB) type systems as further described below and/or in non-ITB systems, wherein images are transferred directly from a photoreceptor drum or belt directly to a print medium such as sheet paper without the use of an ITB.

As shown in FIG. 7, in certain embodiments, each marking device 402 includes a cylindrical drum photoreceptor 504 employed as an intermediate transfer substrate for subsequent transfer to the intermediate transfer belt 404 before final image transfer to a final printable medium 408, such as cut sheet paper. With reference to FIG. 6, the illustrated printing system 400 includes a transfer station 406 downstream of the marking devices 402 to transfer marking material from the ITB 404 to an upper side of a final print medium 408 traveling along a path P1 from a media supply. After the transfer of toner to the print medium 408 at the transfer station 406, the final print medium 408 is advanced to a fuser type affixing apparatus 410 along a path P1 where the transferred marking material is fused to the print medium 408. In other embodiments, a single photoreceptor belt 404 is used with the marking devices 402 forming an image on the photoreceptor belt 404, and the image developed on the belt is directly transferred to a printed medium 408.

The system controller 422 performs various control functions and may implement digital front end (DFE) functionality for the system 400. In addition, the document processing system 400 may implement the above described techniques for adjusting the timing of the ROS beams to compensate for banding. In this regard, the controller 422 may implement the above described process 100 using the marking engines 402 and one or more sensors 460. The controller 422 can be any suitable form of hardware, processor-executed software and/or firmware, programmable logic, or combinations thereof, whether unitary or implemented in distributed fashion in a plurality of processing components.

In a normal printing mode, the controller 422 receives incoming print jobs 418 and operates one or more of the marking devices 402 to transfer marking material onto the ITB 404 in accordance with image data of the print job 418. In a banding compensation adjustment mode or alternatively during the normal printing mode, the controller 422 operates in accordance with the above described process 100. During operation of the marking devices 402, marking material (e.g., toner 451 for the first device 402 in FIG. 6) is supplied to an internal drum photoreceptor 504 (schematically shown in FIG. 7) via a ROS 500 of the marking device 402, and toner 451 is transferred to the ITB 404 with the assistance of a biased transfer roller (not shown) to attract oppositely charged toner 451 from the drum 504 onto the ITB surface as the ITB 404 passes through a nip between the drum 504 and the biased transfer roller. The toner 451 ideally remains on the surface of the ITB 404 after it passes through the nip for subsequent transfer and fusing to the final print media 408 via the transfer device 406 and fuser 410 in FIG. 6. In the multi-color example of FIG. 6, each xerographic marking device 402 is operable under control of the controller 422 to transfer toner 451-454 of a corresponding color (e.g., cyan (C), magenta (M), yellow (Y), black (K)) to the transfer belt 404. The system 400 also includes one or more sensors 460 internal to the marking stations 402 and/or external thereto, for instance, to measure one or more marking material transfer characteristics such as toner density relative to the intermediate transfer belt 404 or other photoreceptor or with respect to a final printed medium 408, and corresponding feedback signals or values are provided to the controller 422. Notably, as previously discussed, toner density variations measured for a printed test pattern are used to set up the ROS, i.e. beam delay values, to perform EBC for a measured banding frequency associated with the beating of high frequencies.

As seen in FIGS. 7-9, the exemplary xerographic stations 402 each include a multi-beam ROS 500 which generates latent images along a circuitous length of a drum type photoreceptor 504 (shown in partial section view with the process direction into the page in FIG. 7) using a plurality of beams 522. A ROS controller 502 provides one or more control signals or values to a driver 512 and a ROS clock 501, and a stream of image data is provided from the controller 502 to the driver 512 associated with 32 laser-type light sources 514, for instance, arranged as a laser emitter array of eight groups of four lasers in one embodiment. The ROS controller 502 also operates the ROS clock 501, which in turn provides a clock output to the driver 512 and to a motor polygon assembly (MPA) that includes a polygon motor speed control 528a and the rotating polygon 528 with a plurality of reflective (e.g., mirrored) outer surfaces or facets 526 (eight facets 526 are shown for illustration in the example of FIG. 7, but other embodiments may have more or fewer facets 526).

In operation, a stream of image data is provided to the driver 512 associated with a single color portion of a panel image in the printer 400, and the driver 512 modulates the lasers 514 to produce a plurality of modulated light outputs or beams 522 in conformance with the input image data. The laser beam light output 522 passes into conditioning optics 524 and then illuminates a facet 526 of the rotating polygon 528. The light beams 522 are reflected from the polygon facet 526 through imaging optics 530 to form corresponding spots on the photosensitive image plane portion of the passing photoreceptor 504 drum. Rotation of the facet 526 causes the spots to be swept or scanned across the image plane in the cross-process or fast scan direction FS to form a succession of scan lines generally perpendicular to a "slow scan" or process direction PD along which the photoreceptor 504 travels. In the multi-beam arrangement of the ROS 500, 32 such scan lines are created concurrently as a group or swath with the image data provided to the individual lasers 514 being interleaved accordingly. Successive rotating facets 526 of the polygon 528 form successive sets or swaths of 32 scan lines that are offset from each other as the photoreceptor 504 travels in the process direction. In this regard, each facet 526 may scan 32 scan lines, but the photoreceptor 504 may move such that the top 16 scan lines from the next facet 526 can overlap the bottom 16 scan lines from the previous facet 526 in an interleaved or overlapped fashion. In this regard, the disclosed methods of EDC can be used in systems in which scan lines are overwritten (overlapped) with or without interleaving, and/or in systems that employ interleaving with scan lines from a subsequent swath written in between scan lines from a previous swath, or combinations or variations thereof.

Within each set of 32 scan lines, moreover, the laser emitter array 514 provides mechanical spacing of the individual light outputs 522 such that the spacing of adjacent scan lines is ideally uniform. Each such scan line in this example consists of a row of pixels produced by modulation of the corresponding laser beam 522 according to the corresponding image data as the laser spots scan across an image plane, where individual spots are either illuminated or not at various points as the beams scan across the scan lines so as to selectively illuminate or refrain from illuminating individual locations on the photoreceptor 504 according to the input image data. In this way a latent image is created by selectively discharging the areas of the photoreceptor 504 which are to receive a toner image. Exposed (drawn) portions of the image to be printed move on to a toner deposition station (not shown) where toner adheres to the drawn/discharged portions of the image. The exposed portions of the image with adherent toner then pass to a transfer station with a biased transfer roller (BTR, not shown) for transfer of the toner image to the intermediate transfer belt (ITB 404 in FIG. 6 above).

As seen in FIGS. 7-9, moreover, the ROS driver 512 selectively employs banding correction or beam timing control 506 under direction of the ROS controller 502 to vary the timing of the light outputs 522 provided by the light source or sources 514 during scanning in order to mitigate banding in the final print media 408. The MPA polygon 528 then directs the modulated light outputs 522 toward the photoreceptor medium 504 along the fast scan direction to generate an image on at least a portion of the medium 504. As seen in FIG. 7, moreover, rotation of the current facet 526 of the polygon 528 scans the one or more modulated light outputs 522 directly or indirectly to the photoreceptor 504 along the fast scan direction FS, where one or more optical components may lie between the polygon facet 526 and the photoreceptor 504, where one simplified example (lens 530) is illustrated in FIG. 7. In operation, the controller 502 of the ROS 500 (FIGS. 7-9) causes the driver 512 to selectively vary the timing of the light output(s) 522 provided by the light source(s) 514 during scanning so as to mitigate banding.

In certain embodiments, the ROS 500 includes an MPA encoder 508 which provides an output to the ROS controller 502, which can be any signal or value that indicates the identity of a reflective facet 526 of the rotating polygon 528 that is currently scanning light output(s) 522.

As seen in FIG. 8, in certain embodiments that use multiple light sources 514 (e.g., an array of 32 lasers 514 in the illustrated example), the controller 502 may cause the driver 512 to selectively vary the beam timing of all the modulated light outputs 522 provided by the light sources 514. In one possible implementation, the ROS 500 may include programmable logic, such as an application specific integrated circuit (ASIC) that controls the operation of the laser source(s) 514.

FIG. 9 shows another example using multiple laser light sources 514 (e.g., 32 in the illustrated implementation), in which more than one banding correction beam delays are used. The ROS controller 502 causes the driver 512 to selectively vary the beam delay values of the corresponding laser light sources 514 according to the corresponding one of the 32 beam delay values. In one possible implementation, the ROS 500 may include an ASIC or other logic providing the capability to modify 32 individual beam values, wherein the controller 502 can utilize such logic to control the beam timing.

The above embodiments thus allow the process direction banding affects to be corrected on a scanline-by-scanline basis and/or on a swath-by-swath basis (electronic banding correction or compensation), thereby facilitating control over measurable MPA harmonic banding in a given document processing system 400, including variation of amplitude and phase in the process direction, wherein the ROS controller 502 can employ a beam timing control function, varying beam timing and phase in the cross-process/fast scan direction, which will compensate for MPA harmonic banding at all fast scan locations between the start of scan (SOS) and the end of scan (EOS) locations.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A raster output scanner (ROS) for generating an image on a portion of a light-receiving medium traveling along a process path past the ROS, the ROS comprising:
   a plurality of light sources operative to generate a plurality of light outputs;
   a driver operatively associated with the plurality of light sources and operative to selectively actuate the plurality of light sources individually according to corresponding scan line image data to produce a corresponding plurality of modulated light outputs, the driver operatively associated with a memory storing a plurality of beam timing values corresponding to each of the plurality of light sources, the beam timing values set to compensate for banding caused by an interaction with a halftone pattern and process direction density variations associated with the ROS, each beam timing value associated with a cross-process direction delay or advancement of a respective light source, the driver configured to selectively actuate the plurality of light sources according to the corresponding beam timing values based on the scan line image data to produce the plurality of modulated light outputs; and
   a scanner that directs the modulated light outputs from the light sources toward a light receiving medium along the cross-process direction to generate an image on at least a portion of the light receiving medium,
   wherein the beam timing values associated with the halftone pattern provides one of reducing and minimizing the banding caused by the interaction with the halftone pattern, and
   wherein the beam timing values are varied sinusoidally with a phase determined to one of reduce and minimize banding caused by the interaction with the halftone pattern.

2. The ROS of claim 1, wherein the plurality of light sources is a laser emitter array including a plurality of lasers individually operative to generate light outputs, the light-receiving medium is a photoreceptor associated with a printing system, and the scanner is operative to direct the light outputs from the laser emitter array toward the photoreceptor along the cross-process direction to generate a latent image on at least a portion of the photoreceptor.

3. The ROS of claim 2, wherein the scanner includes a polygon mirror with a plurality of reflective surfaces and a polygon motor speed control operative to control rotation of the polygon mirror, where reflection of the modulated light outputs from the laser emitter array off at least one reflective surface of the polygon mirror directs the modulated light outputs toward the photoreceptor.

4. The ROS of claim 1, wherein the scanner includes a polygon mirror with a plurality of reflective surfaces and a polygon motor speed control operative to control rotation of the polygon mirror, where reflection of the modulated light outputs from the light sources off at least one reflective surface of the polygon mirror directs the modulated light outputs toward the light-receiving medium.

5. The ROS of claim 1, wherein the beam timing values are associated with compensating for a periodic banding structure including a spatial frequency in a range of 5-3000 Hz.

6. The ROS of claim 1, wherein the beam delay values are associated with a first set of beam timing values associated with one of a plurality of halftone patterns, and the driver is configured to use a plurality of sets of beam timing values, each set of beam timing values corresponding to one of the plurality of halftone patterns.

7. The ROS of claim 1, wherein the beam timing values associated with the halftone pattern are determined by varying one or more beam timing values until the banding caused by the interaction with the halftone pattern is one of reduced and minimized.

8. A document processing system comprising:
   at least one marking device operative to transfer marking material onto an intermediate medium;
   a transfer station positioned proximate a travel path of the intermediate medium and operative to transfer the marking material from the intermediate medium to a printable media; and
   a raster output scanner (ROS) operatively associated with the at least one marking device to generate an image on a portion of a light-receiving medium, the ROS including:
      a plurality of light sources operative to generate a plurality of light outputs;
      a driver operatively associated with the plurality of light sources and operative to selectively actuate the plurality of light sources individually according to corresponding scan line image data to produce a corresponding plurality of modulated light outputs, the driver operatively associated with a memory storing a plurality of beam timing values corresponding to each of the plurality of light sources, the beam timing values set to compensate for banding caused by an interaction with a halftone pattern and process direction density variations associated with the ROS, each beam timing values associated with a cross-process direction delay or advancement of a respective light source, the driver configured to selectively actuate the plurality of light sources according to the corresponding beam timing values based on the scan line image data to produce the plurality of modulated light outputs; and
      a scanner that directs the modulated light outputs from the light sources toward a light receiving medium along the cross-process direction to generate an image on at least a portion of the light receiving medium,
   wherein the beam timing values associated with the halftone pattern provides one of reducing and minimizing the banding caused by the interaction with the halftone pattern, and
   wherein the beam timing values are varied sinusoidally with a phase determined to one of reduce and minimize banding caused by the interaction with the halftone pattern.

9. The document processing system according to claim 8, wherein the plurality of light sources is a laser emitter array including a plurality of lasers individually operative to generate light outputs, the light-receiving medium is a photoreceptor associated with a printing system, and the scanner is operative to direct the light outputs from the laser emitter array toward the photoreceptor along the cross-process direction to generate a latent image on at least a portion of the photoreceptor.

10. The document processing system according to claim 9, wherein the scanner includes a polygon mirror with a plurality of reflective surfaces and a polygon motor speed control operative to control rotation of the polygon mirror, where reflection of the modulated light outputs from the laser emitter array off at least one reflective surface of the polygon mirror directs the modulated light outputs toward the photoreceptor.

11. The document processing system according to claim 8, wherein the scanner includes a polygon mirror with a plurality of reflective surfaces and a polygon motor speed control operative to control rotation of the polygon mirror, where reflection of the modulated light outputs from the light sources off at least one reflective surface of the polygon mirror directs the modulated light outputs toward the light-receiving medium.

12. The document processing system according to claim 8, wherein the beam timing values are associated with compensating for a periodic banding structure including a spatial frequency in a range of 5-3000 Hz.

13. The document processing system according to claim 8, wherein the beam timing values are associated with a first set of beam timing values associated with one of a plurality of halftone patterns, and the driver is configured to use a plurality of sets of beam timing values, each set of beam timing values corresponding to one of the plurality of halftone patterns.

14. The document processing system according to claim 8, wherein the beam timing values associated with the halftone pattern are determined by varying one or more beam timing values until the banding caused by the interaction with the halftone pattern is one of reduced and minimized.

15. A method of manufacturing or adjusting a document printing system, the method comprising:
   operatively coupling a raster output scanner (ROS) with a marking station in a document processing system;
   determining a plurality of beam timing values corresponding to individual ones of a plurality of light sources of the ROS so as to compensate for banding caused by an interaction with a halftone pattern and process direction density variations associated with the document printing system; and
   storing the plurality of beam timing values in a memory associated with the ROS,
   wherein the beam timing values associated with the halftone pattern provides one of reducing and minimizing the banding caused by the interaction with the halftone pattern, and
   wherein the beam timing values are varied sinusoidally with a phase determined to one of reduce and minimize banding caused by the interaction with the halftone pattern.

16. The method of manufacturing or adjusting a document printing system according to claim 15, comprising:
   determining a plurality of sets of beam timing values corresponding to individual ones of a plurality of light sources of the ROS, each set of beam timing values corresponding to one of a plurality of halftones; and
   storing the plurality of sets of beam timing values in a memory associated with the ROS.

17. The method of manufacturing or adjusting a document printing system according to claim 15, wherein the beam timing values associated with the halftone pattern are determined by varying one or more beam timing values until the banding caused by the interaction with the halftone pattern is one of reduced and minimized.

* * * * *